Nov. 1, 1960  KENJI SHIMOMURA  2,958,312
ROTARY INTERNAL COMBUSTION ENGINE
Filed Sept. 3, 1957  11 Sheets-Sheet 1

KENJI SHIMOMURA
INVENTOR.

BY Wenderoth, Lind & Ponack
ATTORNEYS

K. SHIMOMURA
*INVENTOR.*

Nov. 1, 1960     KENJI SHIMOMURA     2,958,312
ROTARY INTERNAL COMBUSTION ENGINE

Filed Sept. 3, 1957     11 Sheets-Sheet 9

K. SHIMOMURA
INVENTOR.

BY Wenderoth, Lind & Ponack
Attys

[# United States Patent Office

2,958,312
Patented Nov. 1, 1960

2,958,312
ROTARY INTERNAL COMBUSTION ENGINE

Kenji Shimomura, 6 of No. 57 Higashiyumiyacho, Matsu-baradori - Yamatoooji - Higashiiru, Higashiyama-ku, Kyoto, Japan Filed Sept. 3, 1957, Ser. No. 681,762

Claims priority, application Japan June 25, 1957

4 Claims. (Cl. 123—13)

This invention relates to a rotary internal combustion engine. The rotary engine according to the present invention is provided with a cylindrical stator or a cylinder and a rotor rotating coaxially with and within said cylinder, said rotor being borne by end wall members enclosing both open ends of the cylindrical stator. The clearance between the inside surface of the cylinder and the outside surface of the rotor is enclosed by said end wall members to form an annular closed chamber which is to be a combustion chamber. This combustion chamber is divided by two or more projecting members projecting radially from the surface of the rotor and having respective rollers loosely fitted on their top surfaces the projecting members dividing the annular closed chamber into as many combustion chambers. Said projecting members extend axially from one end to the other on the surface of the rotor. The top surface of each projecting member is provided with a recess in which is loosely fitted a roller of the same length as of the projecting member. Both side walls of each projecting member are in gas tight sliding relationship with the inside surfaces of the end wall members. The top surface of each roller is also in gas tight rolling relationship with the inside surface of the cylinder. Stator rollers each supported rotatably by the end wall members, having a length from one end to the other on the inside surface of the cylinder and having an inwardly curved recess along their whole length are inserted in the combustion chambers formed between said cylinder and rotor. Said stator rollers which number one more than the projecting members of the rotor are provided at regular intervals to receive the combustion gas pressure produced in the combustion chamber. Each of said stator rollers will be rotated by the engagement of a driving gear attached to the main shaft of the rotor with a driven pinion attached to the rotating shaft of the stator roller and will be always properly held against the surface of the rotor by a pressure device. The roller on the top surface of the projecting member fits into the inwardly curved recess of the stator rotor during the rotation of the rotor so as to be in gas tight slidable relation therewith.

In the cylinder, between the adjacent stator rollers, a suction port for the fuel mixture gas is formed close to one of the stator rollers and an exhaust port for the combustion gas is formed close to the other. A valve operated by the main shaft of the rotor is set in each of said ports.

In the rotary engine according to the present invention, the fuel gas, which is put under pressure outside the engine, will be sucked through the suction port into the combustion chamber formed by the projecting member provided on the rotor and by the stator roller located behind said projecting member and will be ignited by a firing device in the form of an electric spark plug exposed in the combustion chamber, the projecting member of the rotor will be pushed by the high pressure gas due to said ignition, motion will be given to the rotor, the rotor will thus rotate and power will be generated.

In the rotary engine according to the present invention, as described above, the cylindrical clearance between the rotor and the cylinder is divided into several combustion chambers in each of which the rotor will be continuously rotated by the combustion of the gas. Therefore, two or more combustions of the gas will be obtained during one revolution of the rotor. Thus an engine of a high output per unit weight with a small bulk can be obtained.

A main object of the present invention is to provide a rotary internal combustion engine wherein two or more combustion chambers are provided between a rotor and a cylinder located outside said rotor so that the rotor may be continuously rotated by the explosive force due to the continuous combustion of the gas mixture under pressure fed into each combustion chamber.

Another object of the present invention is to provide a rotary internal combustion engine wherein two or more combustions of the fuel or generations of the energy will occur during one revolution of the rotor.

A further object of the present invention is to provide a rotary internal combustion engine in which the stator rollers are rotatably mounted on the stator and have inwardly curved recesses therein in which rotor rollers engage.

The drawings show an embodiment of the present invention.

The features and essential points of the present invention shall be explained with reference to the drawings.

Figure 1:
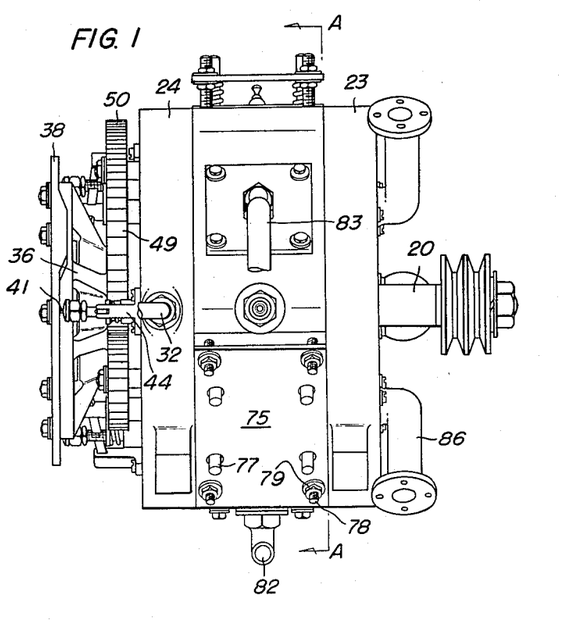
Figure 1 is an elevation of the internal combustion engine of the present invention.
Figure 2:
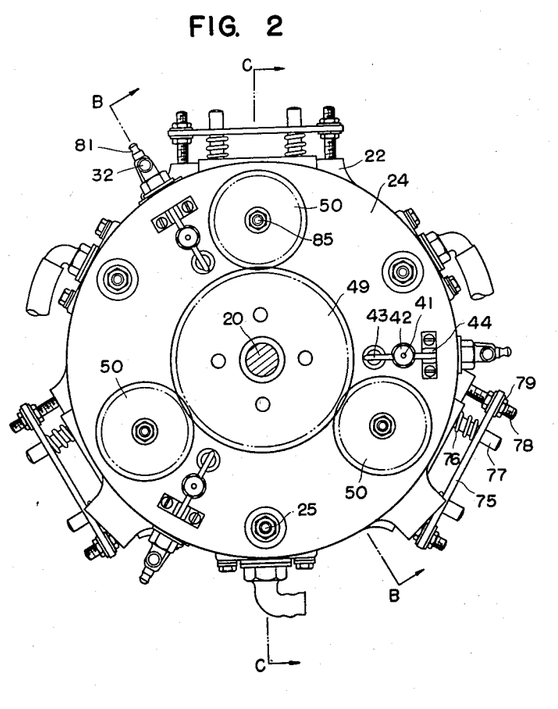
Figure 2 is a side view on the suction side.
Figure 3:
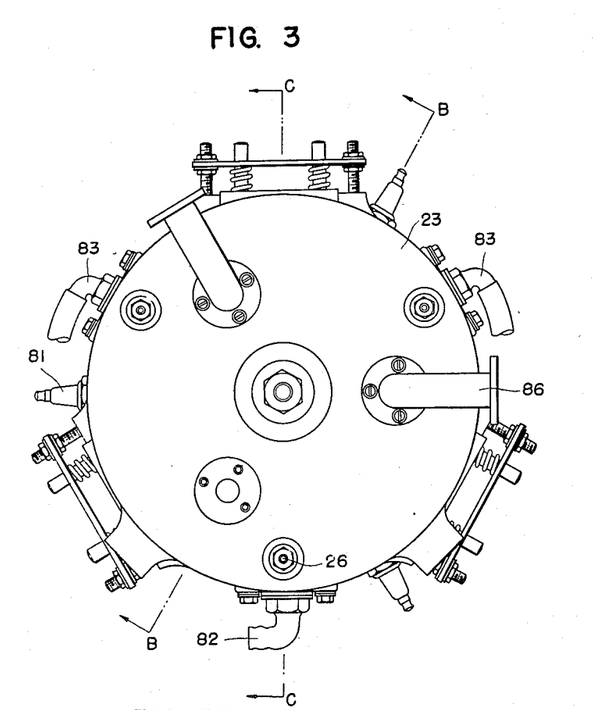
Figure 3 is a side view on the exhaust side.
Figure 7:
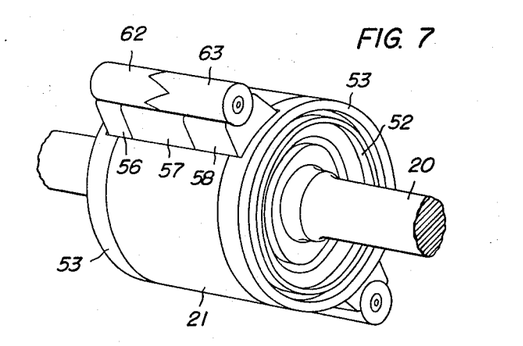
Figure 7 is an assembled view of the rotor (comprising the rotor, rotor roller and rotor roller extending device).

In Figure 1 which is an elevation of the appearance of the assembly, a suction side wall 24 and an exhaust side wall 23 are fastened to the left and right of an outer cylindrical wall 22 by means of bolts 25 in Figure 2 and 26 in Figure 3, respectively. Within the outer wall 22]

is a rotor shown in Figure 7. Its shaft is as seen at 20. In the direction of the suction side wall 24 are a driving gear 49, driven pinions 50, a cam plate 38 fixed to a spider 36 and balls 41 to transmit the cam motion by the contact with the cam plate 38. 42 is a sealing nut. 44 is a valve arm supporter. The fuel coming in through a suction pipe 32 will come out as an exhaust through an exhaust pipe 86. The parts 75, 77, 78 and 79 constitute an extending device for pushing the stator roller into the chamber defined within wall 22. Cooling water is fed through a cooling water port 82 and is discharged through a cooling water outlet 83.

Figure 2 which is a side view of the suction wall side shows the spider 36 removed. The driving gear 49 is in mesh with the driven pinions 50 to transmit the rotation at the ratio of revolutions of 1 to 2. That is to say, the teeth of the driving gear are twice as many in number as those of the driven pinion. The pitch circle diameter of the driving gear is so designed as to coincide with the outer diameter of the rotor 21 shown in Figure 7. The pitch circle diameter of the driven pinions is so designed as to coincide with the outer diameter of the stator rollers 70 and 71.

Figure 3 is a side view on the exhaust side wall side.

Figure 4:
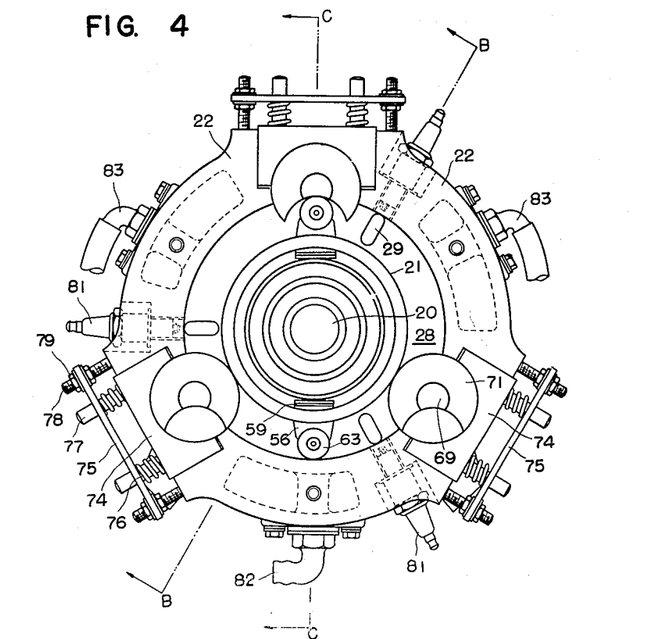
Figure 4 is a side view of the internal structure as sectioned on line A—A in Figure 1.

Figure 4 shows the internal structure with the exhaust side wall 23 removed, viewed in the direction A—A in Figure 1. The stator roller 71 is in contact with the rotor 21. The rotor roller 63 is pressed against the outer wall 22.

Figure 5:
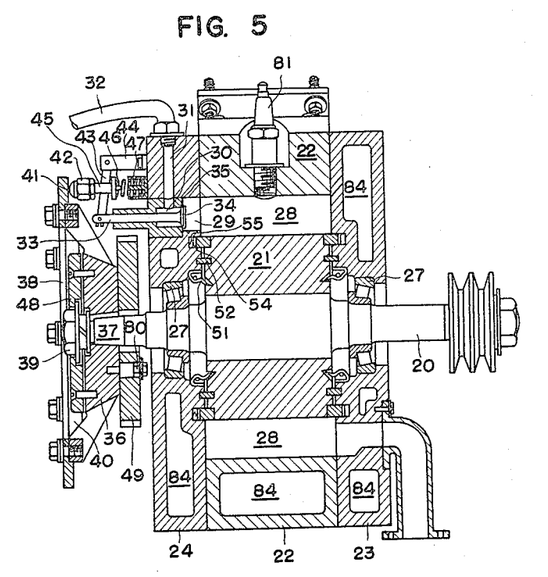
Figure 5 is a sectioned view on line B—B (from the suction valve to the exhaust port) in Figures 2, 3 and 4.

Figure 5 is a sectioned view on line B—B in Figures 2, 3 and 4. The gas sent in through the fuel suction pipe 32 will enter a valve chamber 30. A cam motion transmitting bar 45 will then be pushed by means of the cam plate 38 and the valve 34 will be opened. The gas will be thereby fed into the combustion chamber 28 and will explode in a proper position to rotate the rotor. The rotor shaft 20 is mounted in tapered roller bearings 27. As a lubricating oil is fed to the bearing parts, oil seals 51 are provided therein. Oil rings 52 are also provided.

Figure 6:
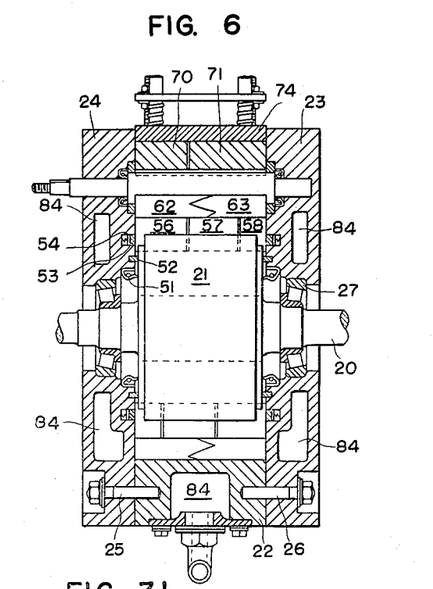
Figure 6 is a sectioned view on line C—C in Figures 2, 3 and 4.

Figure 6 is a sectioned view on line C—C in Figures 2, 3 and 4.

Figure 7 is an assembled view of the rotor.

Figure 8:
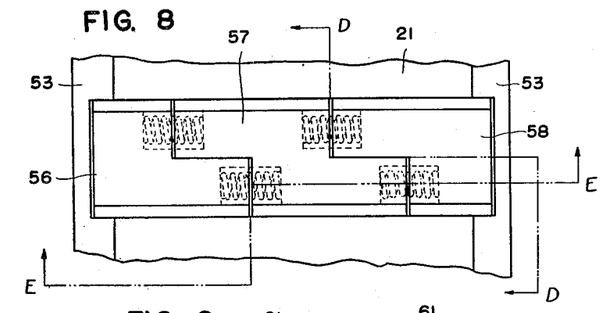
Figure 8 is a partial plan view of the rotor part.
Figure 9:
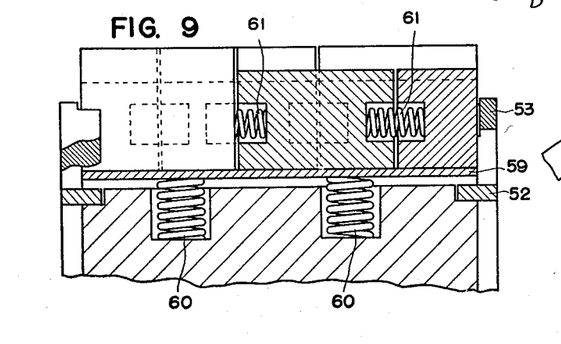
Figure 9 is a sectional view of said rotor part and the rotor roller push-up device according to a line E—E in Figure 8.
Figure 10:
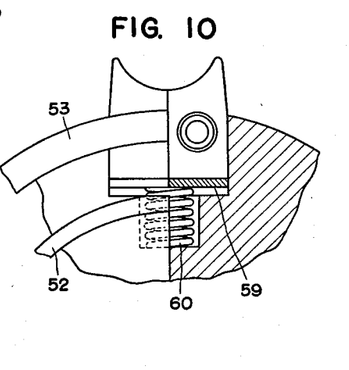
Figure 10 is a side view of the rotor part and the rotor roller push-up device shown in Figure 8, the section being taken at line D—D in Figure 8.

Figures 8 to 10 show the rotor roller extending device. The roller bearing pieces 56, 57 and 58 are located between the rotor 21 and rollers 62 and 63 to push the rollers radially outwardly of the rotor and to prevent gas leakage. A spring 61 is inserted between the roller bearing pieces 57 and 56 and also between the roller bearing pieces 57 and 58 to spread these bearing pieces along the rotor and against the side walls to prevent gas leakage between the roller bearing piece and the side wall. The roller bearing pieces will be urged radially outwardly of the rotor axis by means of a plate 59 and springs 60. The upper surface of the bearing piece is of the same diameter as the roller which can freely rotate thereon.

Figure 11:
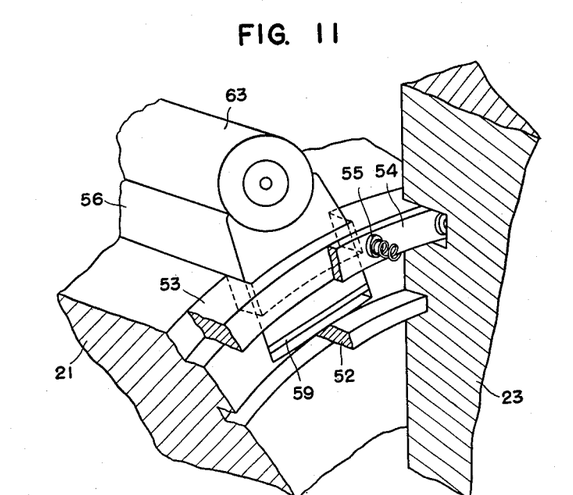
Figures 11 to 13 are detailed views of the rotor part and rotor ring part.
Figure 12:
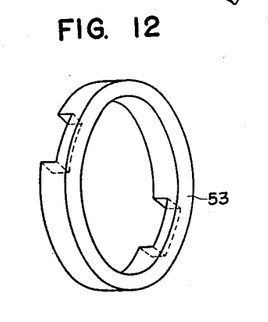
Figure 13:
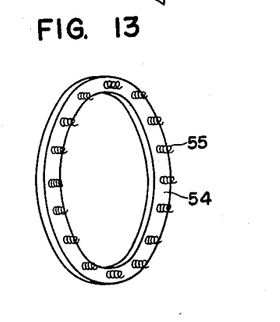

Figures 11 to 13 show the details of the rotor ring part. The rotor ring 53 has recesses in which the bearing pieces 56 are to be fitted beyond the end of the rotor 21 so that the bearing pieces and the ring 53 rotate together. Said rotor ring is pressed by a pressing ring 54 to prevent gas leakage. The pressing ring is fitted in a recess in the side wall 23 and urged toward rotor ring 53 by springs 55. The oil ring 52 is to prevent gas leakage from above or oil leakage from below.

Figures 14 to 18 are assembled views of the rotor roller.

Figure 14:
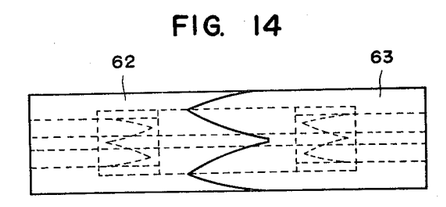
Figures 14 to 18 are assembled detailed views of the rotor roller.
Figure 15:
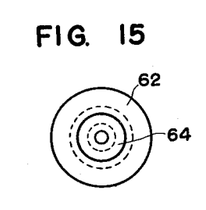
Figure 16:
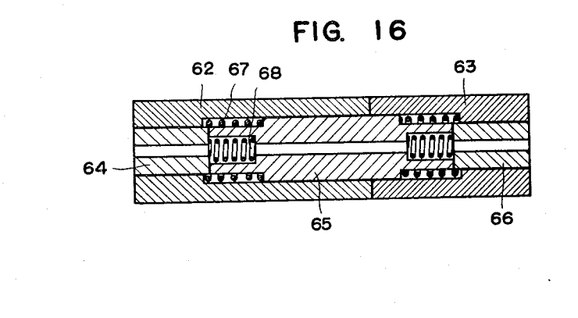
Figure 17:
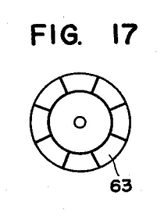
Figure 18:
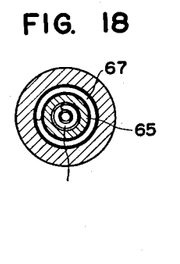
Figure 19:
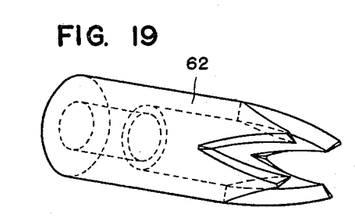
Figures 19 to 25 are disassembled detailed views of the rotor roller.
Figure 20:
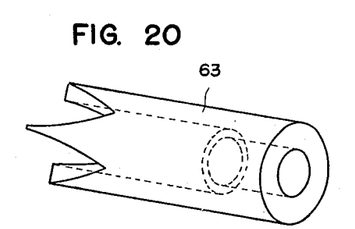
Figure 21:
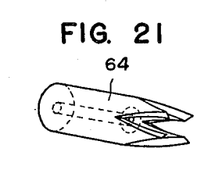
Figure 22:
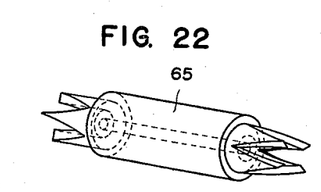
Figure 23:
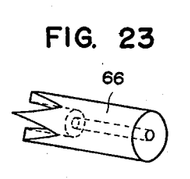
Figure 24:
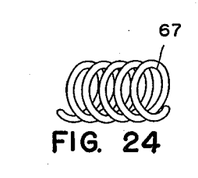
Figure 25:
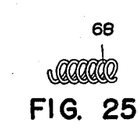

Figures 19 to 23 are disassembled detailed views of the rotor roller shown in Figure 14. The outside roller left piece 62 and the outside roller right piece 63 are urged along the rotor by springs 67 so that they press outwardly and thus prevent gas leakage. As a clearance will be made between the outside roller left piece 62 and the outside roller right piece 63 in such a case, inner rollers 64, 65 and 66 are inserted within and are also made by springs 68 to serve to give a thrust sideward and to prevent gas leakage.

Figure 26:
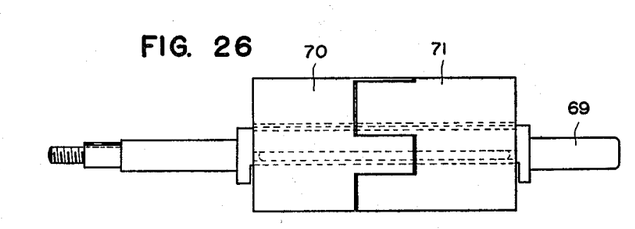
Figure 26 is a side elevation view of the stator roller.
Figure 27:
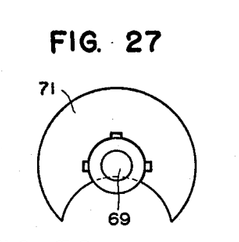
Figure 27 is an end elevation view of the roller of Figure 26.
Figure 28:
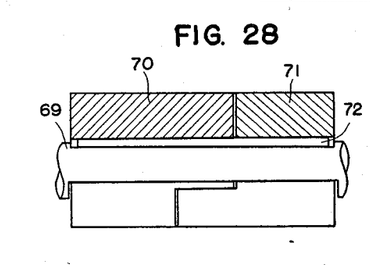
Figure 28 is a sectional elevation view of the rotor taken along line F—F of Figure 29.
Figure 29:
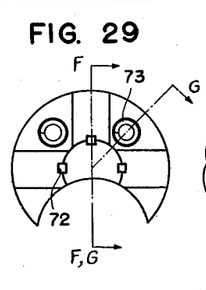
Figure 29 is an end elevation of the roller of Figure 26 with the part 71 removed.
Figure 30:
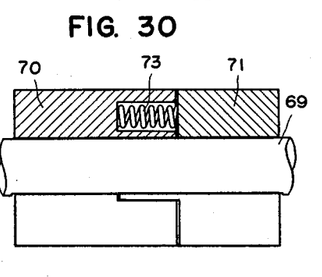
Figure 30 is a sectional view of the roller taken along line G—G of Figure 29.

Figures 26 and 30 show the stator roller. Springs 73 are put in so that rollers 70 and 71 may expand axially along keys 72 on the stator roller shaft 69 and are also to prevent sideward gas leakage. The inwardly curved recess in the rotor is so designed as to have a radius of curvature so as to provide a seal between adjacent combustion chambers at the time of its contact with the rotor roller.

Figure 31:
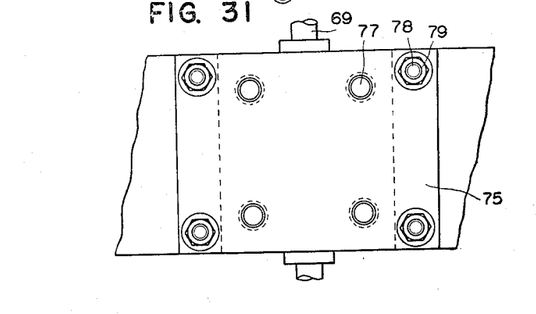
Figures 31 to 33 are detailed views of the stator roller extending device.
Figure 32:
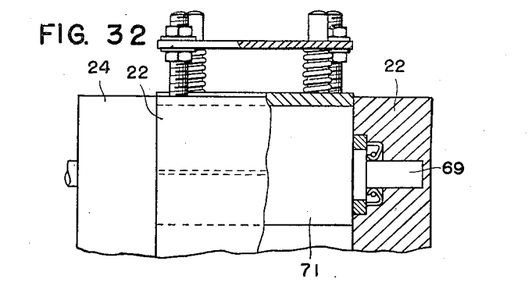
Figure 33:
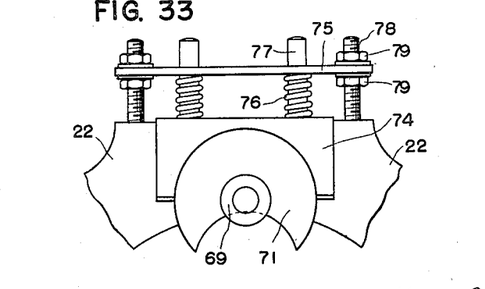

Figures 31 to 33 show the stator roller extending device which urges the stator rollers inwardly against the rotor during the rotation of the roller and will thus prevent gas leakage. A spring bearing plate 75 is fixed by bolts 78 and nuts 79 and serves as an abutment for springs 76 which urge block 74 inwardly. Guide bars 77 are fixed to said block 74 so that said block 74 may move up and down. The bearing plate 75 is so made as to be adjustable by the nuts 79 to control the pressure of the springs 76.

With the engine of the present invention constructed as described above, at the same time as the rotor roller on one projecting member moves around the cylinder due to the explosion in the combustion chamber, the other rotor roller will also likewise move around the cylinder, moving clockwise from the position shown in Figure 4, will rotate the main shaft of the rotor and will enter the next combustion chamber by rolling into the inwardly curved recess in the stator roller provided in the cylinder wall. With the supply of the fuel and the ignition of the spark plugs, the fuel will be exploded in turn and the rotating movement of the rotor will be continued. In the illustrated embodiment, the kinetic energy will be given to the rotor roller 63 three times during one revolution of the rotor and to the other rotor roller also three times.

The compressed fuel in the combustion chamber is ignited for combustion by electric spark plugs. The same plugs as are used in reciprocating engines can be used in the present invention. Therefore, the classification and electric processes shall not be described herein.

The rotary engine according to the present invention will of course produce such a large amount of heat the same as in any other combustion engine that cooling is necessary. Therefore, as an example of cooling, cooling water chambers are provided in the cylinder wall and both end wall members.

The engine according to the present invention is useful for all land uses, ships and motor bicycles. However, illustrated in the accompanying drawings is a stationary engine which is for general uses.

What I claim is:

1. In a rotary internal combustion engine having a cylindrical stator with end walls thereon, a rotor rotatably mounted in the stator and having spring loaded radially outwardly projecting members thereon, and radially inwardly spring loaded members on the stator, that improvement comprising rotor rollers rotatably mounted on the radially outwardly projecting members on the rotor, said rotor rollers being formed of a plurality of opposed axially aligned parts spring loaded away from each other and each having spaced projections thereon engaged in sealing engagement between corresponding spaced projections on an opposed part, and stator rollers rotatably mounted on the radially inwardly spring loaded members on the stator, said stator rollers being formed of a plurality of opposed axially aligned parts spring loaded away from each other and each having spaced projections thereon engaged in sealing engagement between the corresponding spaced projections on an opposed part, said stator rollers each further having an inwardly curved recess therein engageable by said rotor rollers for forming a seal between spaces in the stator on either side of said stator rollers.

2. Improvement as claimed in claim 1 in which said rotor rollers each have two hollow axially aligned outer parts and three axially aligned inner parts slidable within said two outer parts, the outside diameter of said inner parts and the inside diameter of at least a portion of said outer part being substantially equal.

3. The improvement as claimed in claim 2 in which the central inner part has a cylindrical enlargement thereon and the outer parts have a cylindrical enlargement in the hollow interior thereof corresponding to the cylindrical enlargement on said central inner part, and the spring loading comprising a spring between each end of the cylindrical enlargement on the central inner part and the ends of the cylindrical enlargement in the hollow interior of said outer parts, and springs between each pair of the three aligned inner parts.

4. The improvement as claimed in claim 1 in which each stator roller has two parts, and a keyed shaft on which said parts are slidable.

References Cited in the file of this patent

UNITED STATES PATENTS

| | | |
|---|---|---|
| 725,412 | Cornell | Apr. 14, 1903 |
| 865,117 | Muhl | Sept. 3, 1907 |
| 901,554 | Pearson | Oct. 20, 1908 |
| 1,098,256 | Harper | May 26, 1914 |

FOREIGN PATENTS

| | | |
|---|---|---|
| 8,590 | Sweden | July 21, 1896 |
| 326,748 | France | Mar. 3, 1903 |
| 21,077 | Great Britain | 1911 |